United States Patent Office 3,055,748
Patented Sept. 25, 1962

3,055,748
FUEL FOR SPARK IGNITION ENGINES
Robert J. Hartle, Gibsonia, Pa., assignor to Gulf Research & Development Company, Pittsburgh, Pa., a corporation of Delaware
No Drawing. Filed May 12, 1960, Ser. No. 28,532
12 Claims. (Cl. 44—69)

This invention relates to a fuel for high-compression, spark-ignition engines, and more particularly to a gasoline containing an organolead salt of a substituted acid of phosphorus.

It has long been recognized that for greater economy with respect to fuel requirement and greater efficiency in the operation of a gasoline-powdered engine, an engine having a high compression ratio is desired. In order to obtain smooth engine operation with an engine having a high compression ratio, it has generally been necessary to employ a fuel having a high octane rating.

In order to obtain a fuel having a high octane rating the petroleum industry has developed numerous petroleum hydrocarbon conversion processes among which may be mentioned cracking, alkylation, aromatization, cyclization, isomerization, hydrogenation, dehydrogenation, hydrodesulfurization, reforming, hydroforming, polyforming, "Platforming" and combinations of two or more of such processes. These processes produce hydrocarbons boiling in the gasoline boiling point range which have octane ratings and engine performance characteristics markedly superior to the charge stock and to comparable boiling hydrocarbons found in straight-run gasolines.

To improve still further the octane rating of a fuel obtained by one or more of the various conversion processes, the petroleum industry, in most instances, has resorted to the use of an antiknock agent such as tetraphenyllead, tetramethyllead, tetraethyllead, dimethyldiethyllead, and the like. Of these agents, only tetraethyllead has become commercially important. While the addition of tetraethyllead to gasoline improves its octane rating, the resulting fuel has certain disadvantages arising from the presence of the lead. One of the chief objections to the use of a gasoline containing tetraethyllead arises from the tendency of such a fuel upon being burned in the combustion chamber of a spark-ignition engine to form decomposition products of tetraethyllead, a portion of which products is deposited on the walls of the combustion chambers of the engine and on the electrodes and insulators of the spark plugs, thus reducing the efficiency of the engine and offsetting to some extent the increased efficiency obtained by using an engine having a high compression ratio.

In an attempt to overcome the detrimental effect of the deposits of tetraethyllead decomposition products in an engine, various scavenging agents have been added to the fuel to change the form of the tetraethyllead decomposition products to those which are more volatile and thus less likely to be deposited within the engine. For example, various volatile organo halides such as ethylene dibromide and/or ethylene dichloride have been used in admixture with tetraethyllead to produce the corresponding halides of lead which are more volatile than the oxides. The volatile organo halides, however, have not completely overcome the deposition of the decomposition products. The decomposition products comprise various salts including the oxides, sulfates, bromides and chlorides of lead. These decomposition salts deposited within the combustion chamber of the engine have been found to alter adversely the engine operation. The adverse effect encountered as a result of the deposits of the decomposition salts is frequently evidenced by wild ping and rumble. The wild ping and rumble thus encountered is that associated with preignition of the fuel in the combustion chamber of a spark-ignition engine. This wild ping and rumble associated with preignition should not be confused with knocking due to explosive autoignition of the unburned portion of the fuel-air mixture to be traversed by the normal flame from the spark plug.

In order to improve the preignition characteristics of a fuel, various phosphorus-containing compounds have been added to the fuel to further alter the physical and chemical characteristics of the deposits. While many of the phosphorous-containing compounds have reduced spark plug fouling and deposit-induced autoignition or wild ping, the phosphorus compounds of the prior art have not improved the octane rating of the fuel and in most instances have decreased the octane rating of the fuel as determined by the motor method (ASTM: D357-53) and/or the research method (ASTM: D908-55).

I have found that the octane rating of a motor fuel such as gasoline whether or not it contains tetraethyllead can be improved and that the preignition tendencies of an engine operated with a gasoline containing tetraethyllead can simultaneously be reduced by incorporating in the fuel a small amount of an organolead salt of a substituted acid of phosphorus having the structural formula

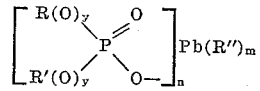

wherein y is an integer from 0 to 1; R is a substituent selected from the class consisting of alkyl, alkenyl, alkynyl, aryl, aralkyl, alkaryl and cycloalkyl groups; R' is a substituent selected from the class consisting of alkyl, alkenyl, alkynl, aryl, aralkyl, alkaryl, cycloalkyl and Pb(R")₃ groups; R" is a substituent selected from the class consisting of alkyl, aryl, aralkyl and alkaryl groups; m is at least 1; n is at least 1; m+n is 4; and wherein the total number of carbon atoms in the radical

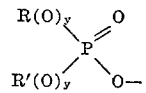

is at least 6. The groups designated as R, R' and R" in the structural formula can be either alike or different.

While all of the organolead salts of the substituted acids of phosphorous designated by the above structural formula can be used to produce a motor fuel having improved preignition characteristics, it will be understood, of course, that their effectiveness may vary.

The alkyllead salts of the mono- and diesters of orthophosphoric acid are particularly advantageous for use in the motor fuels of my invention. While alkyllead salts wherein the alkyl groups attached to the lead are long-chain alkyl radicals such as octyl, nonyl, decyl, octadecyl and the like can be employed, I prefer, for economic reasons, to use those alkyllead salts wherein the alkyl group contains from 1 to 4 carbon atoms. For example I prefer to employ the methyl, ethyl, propyl and butyl lead salts of the mono- and diesters of ortho-phosphoric acid. I have found that the triethyllead salts of the diesters of orthophosphoric acid are particularly effective in reducing the preignition characteristics of a gasoline normally tending to preignite in the combustion chamber of a spark-ignition engine. I have also found that the triethyllead salts of the diesters of orthophosphoric acid have effectively increased the octane rating of a gasoline whether or not the gasoline contains an antiknock agent such as, for example, tetraethyllead.

The organolead salt of the substituted acid of phosphorus incorporated in the motor fuel of this invention can be prepared in any suitable manner. According to a preferred procedure the organolead salt of the substituted acid of phosphorus is formed when a mono- or diester of an oxyacid of phosphorus having 1 to 2 organic substituents at least one of whose organic substituents is a hydrocarbon radical that contains 5 to 22 carbon atoms, and the other of which, when present, is a hydrocarbon radical containing 1 to 22 carbon atoms, is reacted with an organolead compound in the ratio of about 0.5 to about 3 moles of the acid ester of phosphorus per mole of the organolead compound.

The class of acid esters of phosphorus whose use is included by the present invention can be represented by the general formula

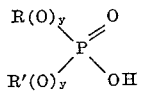

where R is a substituent selected from the class consisting of hydrogen, alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl and cycloalkyl groups; $y$ is an integer from 0 to 1; and wherein the total number of carbon atoms in the acid ester is at least 6. The total number of carbon atoms in the substituted acid phosphorus is preferably 6 to 44. Those substituted acids of phosphorus containing a total of at least 9 carbon atoms are especially preferred.

Preferred acids for use according to the invention are the acid esters of orthophosphoric acid. However, it is to be understood that the broader aspects of the invention include other substituted acids of phosphorus, examples of which are phosphonic acid, the monoester of phosphonic acid and phosphinic acid. Examples of some of the preferred acid esters are methyl amyl monoacid orthophosphate, ethyl amyl monoacid orthophosphate, isopropyl isoamyl monoacid orthophosphate, tertiary butyl isoamyl monoacid ortho phosphate, di(n-amyl) monoacid orthophosphate, di(isoamyl) monoacid orthophosphate, di(hexyl) monoacid orthophosphate, ethyl hexynyl monoacid orthophosphate, ethyl hexyl monoacid orthophosphate, di(2-ethylhexyl) monoacid orthophosphate, mono (2-ethylhexyl) diacid orthophosphate, mono(n - octyl) diacid orthophosphate, di(n - octyl) monoacid orthophosphate, methyl n-octyl monoacid orthophosphate, ethyl n-octyl monoacid orthophosphate, n-propyl n - octyl monoacid orthophosphate, mono(isooctyl) diacid orthophosphate, di(isooctyl) monoacid orthophosphate, isopropyl isooctyl monoacid orthophosphate, oleyl isooctyl monoacid orthophosphate, isoamyl isooctyl monoacid orthophosphate, mono(nonyl) diacid orthophosphate, di(nonyl) monoacid orthophosphate, methyl nonyl monoacid orthophosphate, ethyl nonyl monoacid orthophosphate, propyl nonyl monoacid orthophosphate, di(decyl) monoacid orthophosphate, methyl decyl monoacid orthophosphate, ethyl decyl monoacid orthophosphate, propyl decyl monoacid orthophosphate, cetyl decyl monoacid orthophosphate, di(lauryl) monoacid orthophosphate, ethyl lauryl monoacid orthophosphate, oleyl lauryl monoacid orthophosphate, di(tetradecyl) monoacid orthophosphate, ethyl tetradecyl monoacid orthophosphate, di(cetyl) monoacid orthophosphate, ethyl cetyl monoacid orthophosphate, lauryl cetyl monoacid orthophosphate, di(stearyl) monoacid orthophosphate, ethyl stearyl monoacid orthophosphate, oleyl stearyl monoacid orthophosphate, di(oleyl) monoacid orthophosphate, ethyl n-octadecynyl monoacid orthophosphate, ethyl oleyl monoacid orthophosphate, di(linoleyl) monoacid orthophosphate, ethyl linoleyl monoacid orthophosphate, di(eicosyl) monoacid orthophosphate, ethyl eicosyl monoacid orthophosphate, mono (eicosyl) diacid orthophosphate, mono(docosyl) diacid orthophosphate, lauryl phenyl monoacid orthophosphate, di(isosyl) monoacid orthophosphate, di(benzyl) monoacid orthophosphate, ethyl benzyl monoacid orthophosphate, di(phenyl) monoacid orthophosphate, ethyl phenyl monoacid orthophosphate, octyl phenyl monoacid orthophosphate, lauryl phenyl monoacid orthophosphate, di(isooctylphenyl) monoacid orthophosphate, lauryl naphthyl monoacid orthophosphate, di(naphthyl) monoacid orthophosphate, mono(cresyl) diacid orthophosphate, di(cresyl) monoacid orthophosphate, di(xylyl) monoacid orthophosphate, di(methylcyclohexyl) monoacid orthophosphate, di(cyclohexyl monoacid orthophosphate, di(cycloheptyl) monoacid orthophosphate, di(ethylcyclohexyl) monoacid orthophosphate, di(ethylcycloheptyl) monoacid orthophosphate, phenyl tolyl monoacid orthophosphate, methanephosphonic acid ethanephosphonic acid, butanephosphonic acid, dodencanephosphonic acid, benzenephosphonic acid, monomethyl methanephosphonate, monoethyl methanephosphonate, monobutyl benzenephosphonate, dioctyl phosphinic acid and methyl hexyl phosphinic acid.

The acid esters of phosphorus are conventional materials, and a number of them are commercially available. Accordingly, their method of preparation is not a part of this invention and it suffices to note that they can be prepared by reacting phosphorus pentoxide with alcohols in molecular proportions sufficient to give either mono- or diesterfied compounds.

The organolead compounds which can be used in preparing the organolead salt of the substituted acid of phosphorus include the alkyl, aryl, aralkyl and alkaryl derivatives of lead. Examples of the organolead compounds which can be used thus include tetramethyllead, dimethyldiethyllead, hexaethyldilead, tetraethyllead, tetra-n-propyllead, tetraisopropyllead, tetraisobutyllead, tetraphenyllead, tetrabenzyllead, tetra(phenylethyl)lead, tetra-(p-ethylphenyl)lead, and tetra-p-tolyllead. The alkyllead compounds wherein the alkyl group contains 1 to 4 carbon atoms form a preferred group of compounds from which the corresponding alkyllead salts of the substituted acids of phosphorus are prepared.

Many of the organolead compounds used in preparing the organolead salts of the substituted acids of phosphorus are available commercially. Thus, neither the organolead compounds nor their method of preparation is a part of this invention. Some of the organolead compounds are prepared by decomposing the corresponding organolead halide. The lower lead tetra-alkyls can be obtained from lead chloride and dialkylzinc or alkylmagnesium salts. However, when alkylmagnesium salts containing alkyl radicals with more than three carbon atoms are used, unsaturated lead-alkyls such as lead tri-alkyls are preferentially formed. Tetraethyllead is conveniently prepared commercially from ethyl chloride and a sodium-lead alloy. Regardless of how the alkyllead compounds are obtained, extreme caution should be observed in handling them inasmuch as they are very poisonous.

The process used in preparing the organolead salts of the substituted acid of phosphorus varies somewhat depending upon the particular compounds being reacted. According to one embodiment, 0.5 to 3 moles of the desired acid ester of phosphorus is admixed with 1 mole of the desired organolead compound, preferably in an inert solvent such as xylene, toluene, etc. The mixture thus formed is thereafter heated to about 40° to about 60° C. to initiate the reaction. Once the reaction is started, it is exothermic. The reaction rate may be followed by trapping and measuring the hydrocarbon evolved. The reaction is nearly complete in one to three or four hours, but may continue at a slow rate for another twenty-four hours or more. The solvent can then be removed or the product can be used as a concentrate without removing the solvent. According to another embodiment, an alkali metal salt of the desired acid phosphate ester is reacted with a halide of the desired organolead compound in an inert solvent such as benzene, hexane or toluene. The reaction mass thus obtained comprises the desired organolead salt of the substituted acid of phosphorus in admixture with an alkali metal halide. The alkali metal halide is removed from the reaction mass by filtration. Upon removal of the inert solvent, a product comprising the desired organolead salt of the substituted acid of phosphorus is obtained.

The following specific examples will serve to illustrate the preparation of the triethyllead salts of various organo-substituted acids of phosphorus.

EXAMPLE 1

Triethyllead Di(Cresyl)Phosphate

Into a 100 cc. round-bottom flask equipped with a thermometer and a reflux condenser are placed 16.2 grams (0.05 mole) of tetraethyllead and 13.9 grams (0.05 mole) of di(cresyl) monoacid orthophosphate. Reaction begins immediately and the temperature rises to about 60° C. Ethane is evolved rapidly. The reaction mixture is cooled to room temperature and allowed to stand overnight. The total ethane recovered during this period is about 1050 to 1100 cc. The product is a clear viscous liquid soluble in hydrocarbons, and contains about 36.19 percent lead. The calculated amount of lead in the triethyllead salt of di(cresyl) monoacid phosphate is 36.10 percent.

EXAMPLE 2

Triethyllead Isoamyl Octyl Phosphate

Into a 100 cc. round-bottom flask equipped with a thermometer and a reflux condenser are placed 16.2 grams (0.05 mole) of tetraethyllead and 12 grams (0.05 mole) of isoamyl octyl monoacid orthophosphate. The reaction mass is heated slowly to about 40° C. at which temperature the reaction begins as evidenced by the evolution of gas. The temperature of the reaction mass rises slowly to about 70° C. The reaction mass is then cooled to room temperature and allowed to stand for about 24 hours while the ethane gas continues to be released slowly. The product comprises about 27.5 grams of a colorless liquid which contains 39.71 percent lead. The calculated amount of lead in triethyllead isoamyl octyl phosphate is 36.15 percent.

EXAMPLE 3

Triethyllead Ethyl Oleyl Phosphate

Into a 100 cc. round-bottom flask equipped with a thermometer and a reflux condenser are placed 16.2 grams (0.05 mole) of tetraethyllead, 18.8 grams (0.05 mole) of ethyl oleyl monoacid orthophosphate and 50 cc. of xylene. The reaction mass thus formed is heated to about 80° C. and maintained at this temperature for about 1 hour. The reaction is substantially complete after maintaining the reaction mass at a temperature of about 80° to 90° C. for an additional hour. The product thus obtained is a clear amber liquid weighing about 75.1 grams. The product comprises a solution of triethyllead ethyl oleyl phosphate in xylene. The product can be used as such in the form of a concentrate or the xylene can be removed. Upon removal of the xylene the triethyllead salt analyzes about 31.40 percent lead. The calculated amount of lead in the triethyllead salt of ethyl oleyl monoacid orthophosphate is 31.00 percent.

EXAMPLE 4

Triethyllead Ethyl Lauryl Phosphate

Into a 100 cc. round-bottom flask equipped with a thermometer and a reflux condenser are placed 16.2 grams (0.05 mole) of tetraethyllead and 14.7 grams (0.05 mole) of ethyl lauryl monoacid orthophosphate. The reaction mass is then heated gradually to 40° C. at which temperature the reaction begins to take place and the temperature rises to about 70° C. The reaction mass is then held at about 65° to 70° C. for 3 hours. The reaction mass is then cooled to room temperature and allowed to stand overnight. The product, weighing 29.7 grams, is a clear viscous liquid, soluble in hydrocarbons and contains about 33.10 percent lead. The calculated amount of lead in the triethyllead salt of ethyl lauryl monoacid orthophosphate is 35.30 percent.

EXAMPLE 5

Triethyllead Di(p-Isooctyl Phenyl)Phosphate

The procedure of Example 3 is followed except di(p-isooctylphenyl) monoacid orthophosphate is substituted for ethyl oleyl monoacid orthophosphate. The resulting product comprises triethyllead di(p-isooctylphenyl)-phosphate.

EXAMPLE 6

Triethyllead Di(Phenyl)Phosphate

The procedure of Example 3 is followed except di-(phenyl) monoacid orthophosphate is substituted for ethyl oleyl monoacid orthophosphate. The resulting product comprises triethyllead di(phenyl)phosphate.

EXAMPLE 7

Triethyllead Di(Benzyl)Phosphate

The procedure of Example 3 is followed except di-(benzyl) monoacid orthophosphate is substituted for ethyl oleyl monoacid orthophosphate. The resulting product comprises triethyllead di(benzyl)phosphate.

EXAMPLE 8

Triethyllead Methyl Amyl Phosphate

The procedure of Example 2 is followed except methyl amyl monoacid orthophosphate is substituted for isoamyl octyl monoacid orthophosphate. The resulting product comprises triethyllead methyl amyl phosphate.

EXAMPLE 9

Triethyllead Di(2-Ethylhexyl)Phosphate

The procedure of Example 2 is followed except di(2-ethylhexyl) monoacid orthophosphate is substituted for isoamyl octyl monoacid orthophosphate. The resulting product comprises triethyllead di(2-ethylhexyl)phosphate.

EXAMPLE 10

Triethyllead Di(Isooctyl)Phosphate

The procedure of Example 2 is followed except di(isooctyl) monoacid orthophosphate is substituted for isoamyl octyl monoacid orthophosphate. The resulting product comprises triethyllead di-isooctyl)phosphate.

EXAMPLE 11

Triethyllead Di(Cyclohexyl)Phosphate

The procedure of Example 2 is followed except di-(cyclohexyl) monoacid orthophosphate is substituted for isoamyl octyl monoacid orthophosphate. The resulting product comprises triethyllead di(cyclohexyl)phosphate.

EXAMPLE 12

Triethyllead Ethyl Eicosyl Phosphate

The procedure of Example 3 is followed except ethyl eicosyl monoacid orthophosphate is substituted for ethyl oleyl monoacid orthophosphate. Upon removal of the xylene from the reaction mass the resulting product comprises triethyllead ethyl eicosyl phosphate.

It will be understood that the foregoing examples are illustrative only and that other organolead salts of the substituted acids of phosphorus can be similarly prepared. There can be substituted in the above specific examples, in the same or equivalent proportions, other equivalent materials, disclosed herein, for example, tetramethyllead, dimethyldiethyllead, hexaethyldilead, tetraisopropyllead, tetraisobutyllead, tetraphenyllead, tetrabenzyllead, tetra-(phenylethyl)lead, tetra(p-ethylphenyl)lead and tetra-p-tolyllead. Also, other substituted acids of phosphorus can be substituted for the acids in the above examples, in the same or equivalent proportions, such as ethyl octyl monoacid orthophosphate, di(2-methylhexyl) monoacid orthophosphate, di(2-propylhexyl) monoacid orthophosphate, lauryl cetyl monoacid orthophosphate, cetyl decyl monoacid orthophosphate, phenyl tolyl monoacid orthophosphate, distearyl monoacid orthophosphate, dinaphthyl monoacid orthophosphate, or their diacid analogues.

Specific examples of other salts which can be used in motor fuel compositions of the invention are bis(trimethyllead) mono(2-ethylhexyl)phosphate, bis(triethyllead) mono(n-octyl)phosphate, bis(triethyllead) mono(isooctyl)phosphate, bis(triphenyllead) mono(nonyl)phosphate, bis(triisopropyllead) mono(p-tolyl)phosphate, triphenyllead di(phenyl)phosphate, bis(tribenzyllead) mono(benzyl)phosphate, tri(phenylethyl)lead isoamyl octyl phosphate, tri(p-ethylphenyl)lead ethyl oleyl phosphate, tributyllead di(isooctyl)phosphate, tri(2-ethylhexyl)lead di(2-ethylhexyl)phosphate, tri-p-isooctyllead di(p-isooctylphenyl)phosphate, tri-p-tolyllead di(p-tolyl)phosphate, bis(triethyllead) mono(cyclohexyl)phosphate, di(triethyllead) octadecenephosphonate, triethyllead salt of the ethyl ester of octadecenephosphonate and triethyllead ethyl butyl phosphinate.

The amount of the organolead salt of the substituted acid of phosphorus which is incorporated in the fuel depends to some extent upon the particular fuel employed, as well as the particular organolead salt of the substituted acid of phosphorus selected. In general, the amount is between about 0.01 and about 0.5 percent by weight based on the weight of the gasoline. It will be understood, of course, that the optimum amount on a weight basis for one particular compound may not be the optimum amount for another compound. One reason for this is that the effectiveness of the compounds may vary from one compound to another. Another reason is that the molecular weight of one compound may be twice the molecular weight of another compound, so that to obtain an equivalent amount of phosphorus when using the compound having the greater molecular weight, one is required to use twice the amount of compound on a weight basis.

When the organolead salt of the substituted acid of phosphorus is added to a fuel which contains an antiknock agent such as tetraethyllead primarily to improve the preignition characteristics of the fuel, the amount of the organolead salt can be based upon that amount theoretically required to convert the lead introduced into the fuel in the form of tetraethyllead to lead orthophosphate. While improved preignition characteristics can be obtained with very small amounts, amounts corresponding to at least about 0.1 times that theoretically required are preferred. Especially good results are obtained by the use of about 0.2 to about 0.5 times the theoretical amount required. In general, it is not necessary to employ more than the amount theoretically required to convert all of the lead in the tetraethyllead to lead orthophosphate. Amounts greater than the theoretical amount can be employed, but the improvement obtained with the larger amounts over that obtained with from 0.2 to 0.5 times the theoretical amount as a general rule does not justify using the larger amounts for economic reasons. Therefore, I prefer to employ an amount equal to about 0.2 to about 0.5 times that required to convert the lead to lead orthophosphate. In view of the fact that the amount of tetraethyllead in the gasoline varies from one fuel to another, it is difficult to state on a weight basis the amount of a particular compound based upon the weight of the gasoline. However, once knowing the amount of tetraethyllead present in the gasoline, it is an easy matter to calculate the amount of the particular compound required on a weight basis. Most gasolines on the market today contain up to about three or four cubic centimeters of tetraethyllead per gallon of gasoline. Based upon fuels containing up to about four cubic centimeters of tetraethyllead per gallon of gasoline, I have determined that the amount of organolead salt of a substituted acid of phosphorus required is between about 0.01 and about 0.50 percent by weight based on the weight of the gasoline. In any event, the amount of the organolead salt of the substituted acid of phosphorus used is sufficient to improve the octane rating of the fuel whether or not it contains tetraethyllead and to reduce the preignition characteristics while simultaneously improving the octane rating of a fuel containing tetraethyllead.

The motor fuel to which the organolead salt of the substituted acid of phosphorus is added can comprise a mixture of hydrocarbons boiling in the gasoline boiling range. For instance, the gasoline employed can be either a straight-run gasoline or gasoline obtained from a conventional cracking process, or mixtures thereof. The gasoline to which the organolead salt of the substituted acid of phosphorus is added in accordance with my invention can also contain components obtained from processes other than cracking, such as alkylation, aromatization, cyclization, isomerization, hydrogenation, dehydrogenation, hydroisomerization, polymerization, hydrodesulfurization, reforming, hydroforming, polyforming, "Platforming," or combinations of two or more of such processes, as well as "synthetic" gasoline obtained by the Fischer-Tropsch and related processes. A preferred gasoline fuel composition, however, comprises a blend of hydrocarbons obtained by catalytic cracking, "Platforming" and alkylation processes.

In addition to the organolead salt of the substituted acid of phosphorus, the motor fuel can contain other "additive" agents including an upper cylinder lubricant, corrosion and oxidation inhibitors, an alcoholic anti-stalling agent, a metal deactivator, a dehazing agent, an antirust additive, a dye, another ignition control agent, an antiknock agent, and the like. When an antiknock agent, such as tetraethyllead is present, the motor fuel may also contain a lead scavenging agent such as a volatile organo halide or a mixture of volatile organo halides such as ethylene dichloride and/or ethylene dibromide. When these halides are used they are ordinarily present in an amount corresponding to about one or two cubic centimeters per gallon of gasoline. As the amount of tetraethyllead goes down, however, the lead scavenging agent required also decreases. In accordance with the invention, the organolead salt of the substituted acid of phosphorus can replace in whole or in part the tetraethyllead and/or the volatile organohalide lead scavenging agent. However, the organolead salt of the substituted acid of phosphorus can be used in conjunction with the usual amount of volatile organohalide without deleteriously affecting the beneficial effects of the organolead salt of the substituted acid of phosphorus.

When an upper cylinder lubricant is employed it is generally used in an amount of from about 0.25 to about 0.75 percent by volume of the composition, e.g., 0.5 volume percent. This oil should be a light lubricating oil distillate, e.g., one having a viscosity at 100° F. of about 50 to about 500 Saybolt Universal seconds, e.g., about 100 SUS. Although highly paraffinic lubricating distillates can be used, lubricating distillates obtained from Coastal or naphthenic type crude oils are preferred because of their superior solvent properties. The lubricating oil can be solvent-treated, acid-treated, or otherwise refined.

When an oxiation inhibitor is desired, any of the conventional inhibitors can be utilized. The alkylated phenols, e.g., 2,4,6-tri-tertiary-butylphenol and 2,6-ditertiarybutyl-4-methylphenol because of their hydrocarbon-solubility and water-insolubility characteristics are preferred oxidation inhibitors. Such inhibitors when used are incorporated in the gasoline fuel composition in amounts of from about 0.001 to about 0.02 percent by weight of the composition, e.g., 0.007 weight percent.

Exemplary of other specific improvement agents which can be used are N,N'-disalicylidene-1:2-diaminopropane as a metal deactivator and the cocoamine salt of diisooctyl acid orthophosphate as a rust inhibitor agent. The metal deactivator is generally used in small amounts of the order of about 0.0003 to about 0.001 percent by weight based on the fuel composition. The rust inhibitor is generally used in small amounts of the order of about 0.002 to about 0.008 percent by weight based on the fuel composition.

The organolead salts of the substituted acids of phosphorus present no particular problem with respect to their addition to gasoline. While the organolead salt of the substituted acid of phosphorus can be added directly to the gasoline, one convenient method of adding it to the fuel is to form a concentrate thereof with a liquid solvent and thereafter adding the concentrate to the fuel. Any solvent which does not adversely affect the desirable properties of the fuel can be used. Suitable solvents include toluene, benzene, xylene, isooctane, naphtha, gasoline, and the like. The concentrate, of course, can contain other conventional gasoline improvement agents, such as an anti-oxidant, a typical anti-stalling agent, an anti-knock agent, a metal deactivator, an upper cylinder lubricant, an alkyl halide lead scavenging agent, a dehazing agent, an anti-rust additive, another ignition control agent, a dye, and the like. Since the amount of organolead salt of a substituted acid of phosphorus when added to improve the preignition characteristics of the fuel depends to some extent upon the amount of the tetraethyllead present, this method of adding the organolead salt to the gasoline serves as a convenient way of adding the correct amount thereof and tetraethyllead simultaneously. Thus, a gasoline-benefiting concentrate can be made by admixing tetraethyllead or commercially available mixtures of tetraethyllead and a halide of ethylene with the organolead salt of a substituted acid of phosphorus wherein said phosphorus-containing organolead salt is present in an amount between about 0.1 and about 1.0 times the theoretical amount required to convert the lead of the tetraethyllead to lead orthophosphate.

Although the organolead salts of the substituted acids of phosphorus in accordance with this invention are utilized primarily as preignition agents and octane rating improving agents they are additionally useful in that they serve as anti-wear agents to reduce cold corrosive wear in the combustion chamber and they impart valuable oxidation stability properties to gasoline compositions when used in preignition-inhibiting amounts.

In order to illustrate the improved preignition characteristics obtained with a fuel containing triethyllead di-(cresyl)phosphate, a test was employed in which the fuel was burned in commercially available multicylinder spark-ignition engines. These engines had a compression ratio of 10 to 1. In this test, the engines were operated on a cycling schedule consisting of three minutes at 1500 r.p.m. at a 15 brake horsepower load, followed by a one-minute idle at 450 r.p.m. The spark advance in each instance was the manufacturers' setting. The coolant temperatures in and out were 150° F. (±5°) and 160° F. (±5°), respectively. The oil temperature in all instances was 180° F. (±5°). At the end of each twenty-four hours under the above described cycling schedule, noise requirement determinations were made. After the noise requirement determinations were made, the engines were then put back on the cycling schedule for another twenty-four hours. The cycling and noise requirement tests were continued for nine 24-hour periods.

The noise requirement determinations were made according to three successive steps. If noise was encountered in step one, then steps two and three were omitted. If noise was encountered in step two, then only step three was omitted. Noise in this test is intended to include preignition, normal knocking or rumble. The three successive steps of the test are as follows:

(1) At a speed of 1100 r.p.m. the throttle is opened to detent (that is, the rear barrels of the carburetor are just open) at 1-inch Hg intake manifold vacuum.
(2) The engine speed is increased to 1300 r.p.m. at 3-inch vacuum.
(3) The engine is accelerated at 10-inch vacuum from 1300 to 2000 r.p.m., standard spark, and held at this setting for 3 seconds (throttle wide-open at end of 3-second period).

Aural observations are made at steps (1), (2) and (3) and preignition, rumble and knock are recorded.

Ratings are made on the tank fuel (99 research octane number) and the actual noise requirement determined by the use of a set of commercial reference fuels up to an octane number of 113.5. For noise requirements in the range of 113.5 to 120, leaded isooctane is used. Octane numbers above 100 are expressed in the approved extension scale, Wiese octane numbers, which are:

$$\frac{\text{Performance No.} - 100}{3} + 100$$

The data set forth in Table I summarize the results obtained when the test engines were operated under the above test procedure with the base gasoline and the base gasoline containing 0.3 times the theoretical amount of triethyllead di(cresyl)phosphate required to convert the lead added as tetraethyllead to lead orthophosphate. In reporting the results, the initial octane requirement (Initial O.N.) and the final octane requirement (Final O.N.) correspond to the octane requirement of the engine at the beginning and conclusion of the test. The "average octane number" signifies the octane requirement of the engine during tht last five 24-hour periods.

Table I

|  | Engine A | | Engine B | |
| --- | --- | --- | --- | --- |
| Make-up: Percent by vol.—Base gasoline¹+3.0 ml. TEL/gal. | 100 | 100 | 100 | 100 |
| Added: g./gal.—Triethyllead di(cresyl)-phosphate ² | | 1.96(0.3T) | | 1.96(0.3T) |
| Borderline Noise Requirement: | | | | |
| Initial: O.N. | 91 | 95 | 93 | 91 |
| Final: O.N. | 120+ | 104 | 120+ | 110 |
| Increase: O.N. | 29+ | 9 | 27+ | 19 |
| Average octane number | 120+ | 102.4 | 120+ | 103.6 |

¹ The base gasoline was a blended gasoline made up of catalytically cracked gasoline, alkylate and "Platformate."
² Added as 2.81 g./gal. in the form of a 70% toluene concentrate.

The data in the foregoing Table I clearly indicate the improvement obtained when a small amount of triethyllead di(cresyl)phosphate is added to the base gasoline. It will be noted, for example, that the octane number requirement of the engines running on the base gasoline was 120+. The octane number requirement of the engines running on the base gasoline containing triethyllead di-(cresyl)phosphate was 102.4 for Engine A and 103.6 for Engine B. The increase in octane requirement was less in both engines when operating with the improved gasoline than when operating with the base gasoline.

In addition to the above multicylinder engine tests, further tests were conducted in modified single cylinder CFR engines to determine the number of wild pings encountered while operating the engines over a period of about 7 days. The total number of wild pings encountered during the test is indicative of preignition tendencies of the fuel in an engine. In this test the number of wild pings are automatically counted by an electronic wild ping counter. The base gasoline in this test contained 2.8 ml. of tetraethyllead per gallon of gasoline. The base gasoline showed 5,000 wild pings during the 7-day test. The same gasoline which also contained 2.20 g./gal. (0.4T) of triethyllead di(cresyl)phosphate showed only 1000 wild pings over the same test period. Thus, the number of wild pings in the improved gasoline was 80% less than the number encountered in the base gasoline alone.

The octane ratings of gasoline both leaded and unleaded were improved by the addition of small amounts of triethyllead di(cresyl)phosphate as evidenced by the data in Table II.

TABLE II

| Make-up: Percent by vol.: | | | | | | | |
|---|---|---|---|---|---|---|---|
| Base gasoline [1] (clear) | 100 | 100 | | | | | |
| Base gasoline [1] +3.0 ml. TEL/gal | | | 100 | 100 | | | |
| Regular grade of a commercial gasoline containing 2.1 ml. TEL/gal | | | | | 100 | 100 | 100 |
| Added: g./gal.—Triethyllead di(cresyl)phosphate | | 2.4 | | 2.4(0.4T) | | 1.64(0.4T) | 4.1(1.0T) |
| Knock Ratings: | | | | | | | |
| Motor Method: Octane No | 82.6 | 83.1 | 87.4 | 87.5 | 83.5 | 83.9 | 83.8 |
| Research Method: Octane No | 94.3 | 95.0 | 100.4 | 100.5 | 91.7 | 92.6 | 92.7 |

[1] The base gasoline was a blended gasoline made up of catalytically cracked gasoline, alkylate and "Platformate."

The data in the foregoing Table II clearly show that the octane number of the fuel whether leaded or unleaded is improved by the addition of a small amount of triethyllead di(cresyl)phosphate. This is indeed surprising in view of the fact that organic phosphates generally do not give improved octane ratings to gasoline.

Fuels containing triethyllead di(cresyl)phosphate have a further advantage in that the top compression piston rings of the engines in which such fuels are burned show less wear. For example, the top compression ring of an engine operating with a base gasoline containing 2.8 ml. of tetraethyllead per gallon of gasoline showed an average wear of 2.8 milligrams with a high-detergent lubricating oil and 12.3 milligrams with a non-detergent type lubricating oil. Under the same conditions using the same lubricating oils and base gasoline additionally containing 1.4 g. of triethyllead di(cresyl)phosphate per gallon of gasoline, the average wear was reduced to 2.5 and 11.3 milligrams respectively. This wear was determined by the CLR Radioactive Ring Wear Test Procedure. This result was indeed surprising inasmuch as the addition of other phosphorus-containing additives to gasoline generally increase the amount of wear as determined by this cold corrosive wear-type of test.

Typical properties of a motor fuel of the invention comprising a base gasoline made up of catalytically cracked gasoline, alkylate and "Platformate" to which has been added about 3 cubic centimeters of tetraethyllead per gallon of gasoline and 1.96 grams of triethyllead di(cresyl)-phosphate per gallon of gasoline (0.068% by weight based on the gasoline) are shown in Table III. The base gasoline also contained as an oxidation inhibitor 2,6-ditertiarybutyl-4-methylphenol (30 lbs./1000 bbls.) and as a metal deactivator N,N'-disalicylidene-1,2-diaminopropane (1 lb./1000 bbls.). The triethyllead di(cresyl)phosphate comprised about 0.3 times the theoretical amount required to convert the lead of the tetraethyllead to lead orthophosphate.

TABLE III

Base gasoline containing 3 cc, of tetraethyllead per gallon of gasoline and 0.068% triethyllead di(cresyl)phosphate

| | |
|---|---|
| Gravity, ° API | 54.7 |
| Sp. gr. 60°/60° F | 0.759 |
| Sulfur, L, percent | 0.031 |
| Copper strip test, 122° F., 3 hrs | 1A |
| Copper dish gum, mg./100 ml., ASTM: D910-53T | [1] 49.8 |
| Existent gum, ml./100 ml | 22.0 |
| Oxidation stability, min | 1103 |
| Bromine No | 30.0 |
| Knock rating: | |
| Motor method | 89.3 |
| Research method | 100.1 |
| TEL, ml./gal | 3.0 |
| Vapor pressure, Reid, lb | 6.1 |
| Distillation, gasoline: | |
| Over point, ° F | 104 |
| End point, ° F | 370 |
| 10% evap. at ° F | 148 |
| 50% | 239 |
| 90% | 317 |
| Recovery | 97.7 |
| Residue | 1.0 |

[1] This is not indicative of gum formation inasmuch as triethyllead di(cresyl)phosphate is not volatile under the conditions of the gum test.

While my invention is described above with reference to various specific examples and embodiments, it will be understood that the invention is not limited to such examples and embodiments and may be variously practiced within the scope of the claims hereinafter made.

I claim:

1. A gasoline motor fuel comprising a major amount of gasoline and a small amount, sufficient to improve the octane rating of said gasoline, of an organolead salt of a substituted acid of phosphorous having the structural formula

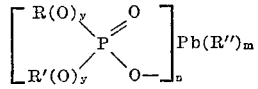

wherein $y$ is an integer from 0 to 1; R is a substituent selected from the class consisting of alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl, cycloalkyl and Pb(R")$_3$ groups; R" is a substituent selected from the class consisting of alkyl, aryl, aralkyl and alkaryl groups; $m$ is at least 1; $n$ is at least 1; $m+n$ is 4; and wherein the total number of carbon atoms in the radical

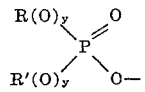

is at least 6.

2. The gasoline composition of claim 1 wherein the amount of the organolead salt of the substituted acid of phosphorus is about 0.01 to about 0.5 percent by weight based on the gasoline.

3. A gasoline motor fuel comprising a major amount of gasoline and about 0.01 to about 0.5 percent by weight based on the gasoline of an alkyllead salt of a substitued acid of phosphorus having the structural formula

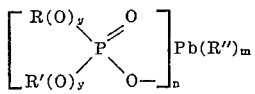

wherein $y$ is an integer from 0 to 1; R is a substituent selected from the class consisting of alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl, cycloalkyl and Pb(R")$_3$ groups; R" is an alkyl group containing 1 to 4 carbon atoms; $m$ is at least 1; $n$ is at least 1; $m+n$ is 4; and wherein the total number of carbon atoms in the radical

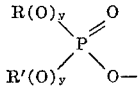

is 6 to 44.

4. A gasoline motor fuel having improved preignition qualities comprising a major amount of gasoline containing about 1 to about 4 cubic centimeters of tetraethyllead per gallon of gasoline and about 0.1 to about 1.0 times the theoretical amount of an organolead salt of a substituted acid of phosphorus required to convert the lead in said tetraethyllead to lead phosphate, said organolead salt of a substituted acid of phosphorus having the structural formula

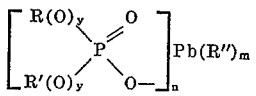

wherein $y$ is an integer from 0 to 1; R is a substituent selected from the class consisting of alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl, cycloalkyl and Pb(R")$_3$ groups; R" is a substituent selected from the class consisting of alkyl, aryl, aralkyl and alkaryl groups; $m$ is at least 1; $n$ is at least 1; $m+n$ is 4; and wherein the total number of carbon atoms in the radical

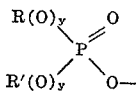

is 6 to 44.

5. A gasoline motor fuel having improved preignition qualities comprising a major amount of gasoline containing about 1 to about 4 cubic centimeters of tetraethyllead per gallon of gasoline and about 0.01 to about 0.5 percent by weight based on the gasoline of an organolead salt of a substituted acid of phosphorus having the structural formula

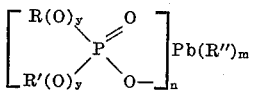

wherein $y$ is an integer from 0 to 1; R is a substituent selected from the class consisting of alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl, cycloalkyl and Pb(R")$_3$ groups; R" is a substituent selected from the class consisting of alkyl, aryl, aralkyl and alkaryl groups; $m$ is at least 1; $n$ is at least 1; $m+n$ is 4; and wherein the total number of carbon atoms in the radical

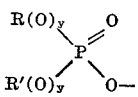

is 6 to 44.

6. A gasoline motor fuel comprising a major amount of gasoline and about 0.01 to about 0.5 percent by weight based on the gasoline of an alkyllead salt of a substituted acid of phosphorus having the structural formula

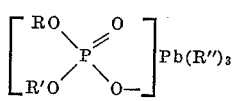

wherein R is a substituent selected from the class consisting of alkyl, alkenyl, alkynyl, aryl, aralkyl, alkaryl and cycloalkyl groups; R' is a substituent selected from the class consisting of alkyl, alkenyl, alknyl, aryl, aralkyl, alkaryl, cycloalkyl and Pb(R")$_3$ groups; R" is an alkyl group containing 1 to 4 carbon atoms; and wherein the total number of carbon atoms in the radical

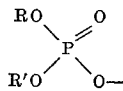

is 6 to 44.

7. A gasoline motor fuel comprising a major amount of gasoline and about 0.01 to about 0.5 percent by weight based on the gasoline of triethyllead di(cresyl)phosphate.

8. A gasoline motor fuel comprising a major amount of gasoline and about 0.01 to about 0.5 percent by weight based on the gasoline of triethyllead isoamyl octyl phosphate.

9. A gasoline motor fuel comprising a major amount of gasoline and about 0.01 to about 0.5 percent by weight based on the gasoline of triethyllead ethyl oleyl phosphate.

10. A gasoline motor fuel comprising a major amount of gasoline and about 0.01 to about 0.5 percent by weight based on the gasoline of triethyllead ethyl lauryl phosphate.

11. A gasoline motor fuel comprising a major amount of gasoline and about 0.01 to about 0.5 percent by weight based on the gasoline of triethyllead di(phenyl)phosphate.

12. A gasoline motor fuel comprising a major amount of gasoline containing about 1 to about 4 cubic centimeters of tetraethyllead per gallon of gasoline, said gasoline normally tending to preignite in the combustion chamber of a spark ignition engine, and a small amount, sufficient to substantially inhibit such preignition without adversely affecting the octane rating of said gasoline, of triethyllead di(cresyl)phosphate.

References Cited in the file of this patent

UNITED STATES PATENTS

| | | |
|---|---|---|
| 2,280,474 | Byrkit et al. | Apr. 21, 1942 |
| 2,301,370 | Cook et al. | Nov. 10, 1942 |
| 2,560,542 | Bartleson et al. | July 17, 1951 |
| 2,784,208 | Ries | Mar. 5, 1957 |
| 2,794,720 | Bartleson | June 4, 1957 |
| 2,863,745 | Cantrell et al. | Dec. 9, 1958 |

FOREIGN PATENTS

| | | |
|---|---|---|
| 572,002 | Canada | Mar. 10, 1959 |

UNITED STATES PATENT OFFICE
CERTIFICATE OF CORRECTION

Patent No. 3,055,748                    September 25, 1962

Robert J. Hartle

It is hereby certified that error appears in the above numbered patent requiring correction and that the said Letters Patent should read as corrected below.

Column 1, line 15, for "gasoline-powdered" read -- gasoline-powered --; line 72, for "combination" read -- combustion --; column 2, line 32, for "alkynl" read -- alkynyl --; line 57, for "ortho-phosphoric" read -- orthophosphoric --; column 3, lines 70 and 71, for "lauryl phenyl monoacid orthophosphate, di(isosyl) monoacid orthophosphate," read -- ethyl docosyl monoacid orthophosphate, di(docosyl) monoacid orthophosphate, --; column 4, line 6, for "di(cyclohexyl monoacid orthophosphate" read -- di(cyclohexyl) monoacid orthophosphate --; line 11, for "dodencanephosphonic" read -- dodecanephosphonic --; column 6, line 47, for "di-isooctyl)" read -- di(isooctyl) --; column 14, line 8, for "alknyl" read -- alkynyl --.

Signed and sealed this 22nd day of January 1963.

(SEAL)
Attest:

ERNEST W. SWIDER                           DAVID L. LADD

Attesting Officer                               Commissioner of Patents